Figure 1:
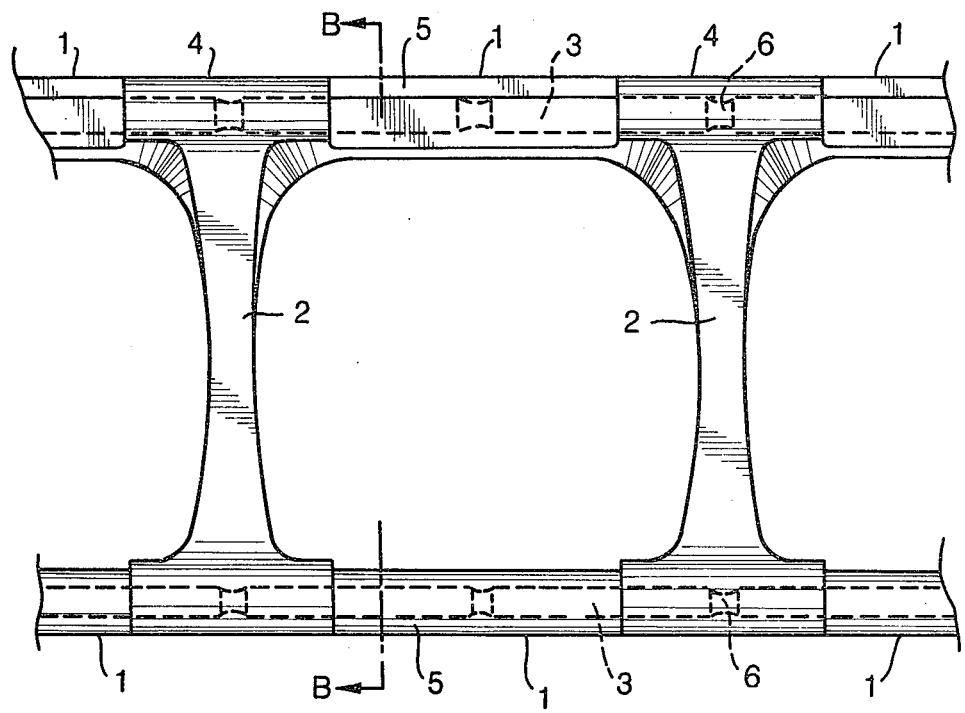

United States Patent [19]

Hallerbäck

[11] 4,436,349
[45] Mar. 13, 1984

[54] ROLLING BEARING

[75] Inventor: Stig L. Hallerbäck, Västra Frölunda, Sweden

[73] Assignee: Aktiebolaget SKF, Gothenburg, Sweden

[21] Appl. No.: 378,136

[22] Filed: May 14, 1982

[30] Foreign Application Priority Data

Jun. 10, 1981 [SE] Sweden ............................ 8103629

[51] Int. Cl.³ ...................... F16C 19/00; F16C 33/38; F16C 33/44
[52] U.S. Cl. .............................. 308/189 R; 308/201; 308/217
[58] Field of Search ........... 308/217, 201, 235, 189 R, 308/207 R, 214, 216

[56] References Cited

U.S. PATENT DOCUMENTS

| 1,996,841 | 4/1935 | Stevens | 308/201 |
| 2,946,633 | 7/1960 | Göthberg | 308/217 |
| 2,969,267 | 1/1964 | Göthberg | 308/217 |
| 4,199,203 | 4/1980 | Pearson | 308/214 X |
| 4,277,117 | 7/1981 | George | 308/201 X |

Primary Examiner—Stuart S. Levy
Assistant Examiner—Thomas R. Hannon
Attorney, Agent, or Firm—Eugene E. Renz, Jr.

[57] ABSTRACT

The invention relates to rolling bearings and concerns particularly the design of retainer and possibly guiding ring of such bearings. The invention is characterized thereby that the retainer or the guiding ring incorporates rings (3) of the material having the same coefficient of thermal expansion as the material of the race rings. These rings are embedded e.g. in plastic, which has another coefficient of thermal expansion than that of the material in the rings.

7 Claims, 6 Drawing Figures

ROLLING BEARING

BACKGROUND AND SUMMARY OF THE INVENTION

The present invention refers to rolling bearings incorporating outer race ring, inner race ring and rolling bodies arranged therebetween and which furthermore has a retainer mainly consisting of plastic material or the like.

Different types of rolling bearings with retainer of plastic material are earlier known. The plastic retainer is less expensive than retainers made of more conventional materials such as brass and steel. The reason for plastic retainers to be cheaper than retainers made from the other mentioned materials is primarily that the manufacture will be simpler. The plastic retainer is thus molded directly, and there is no final treatment of importance. Further advantages with retainers made from plastic material are that they are lighter than the other retainers and give the bearing a more quiet operation.

Retainers made of plastic material have unfortunately also their drawbacks. These are primarily that the mechanical strength of the plastic retainer is lower than that of the conventional retainers. This depends often on the fact that boundary layers are formed in the retainer during the molding when flows of plastic from different casting gates meet. Cracks can easily come up in such boundary layers. The plastic material is also more sensitive to high temperature than e.g. steel and brass.

The biggest disadvantage with retainers made of plastic material is, however, probably that the coefficient of thermal expansion of plastic material is considerably higher, about three times, than that of e.g. steel, from which material the bearing otherwise is made. The diameter of a retainer will therefore at a temperature rise increase more than the diameters of the outer race ring and the inner race ring respectively. If the retainer is centered on the inner race ring, it will therefore get a too big play relative to this; if it is centered on the outer race ring, it may happen that it gets a too small play and press against this ring. And if it is roller centered, a more wobbly and inferior guiding of the rollers will result.

It has therefore since long been a desire to produce retainers from plastic material which have the excellent properties of the plastic but which at the same time have the thermal expansion properties and strength of e.g. steel.

This desire has been satisfied with the present invention, and a rolling bearing has been provided which incorporates outer race ring, inner race ring, rolling bodies and retainer, and possibly guiding ring and which is characterized thereby that the retainer and possibly the guiding ring incorporates rings made from a material which has mainly the same coefficient of thermal expansion as the material in the outer and inner race rings, e.g. steel, and being embedded in another material e.g. plastic, which can have another coefficient of thermal expansion than that of the material in the rings.

According to the invention, the embedding material shall be applied in such a manner or in such a small quantity that the thermal expansion is controlled by means of the embedded rings.

The rings may be divided and joined by means of the embedding material.

The rings should be provided with projections or indentations, for securing a safe attachment of the embedding material.

In order to avoid strains in the retainer, it is possible to let the embedding material be so loosely attached in certain areas that a sliding between this and the ring can occur.

The safe attachment of the embedding material should e.g. at a window type retainer be made at the connections between the webs and the annular parts of the retainer.

It is possible to let the embedding be thinner between the areas of safe attachment than in these areas.

Figure 2:
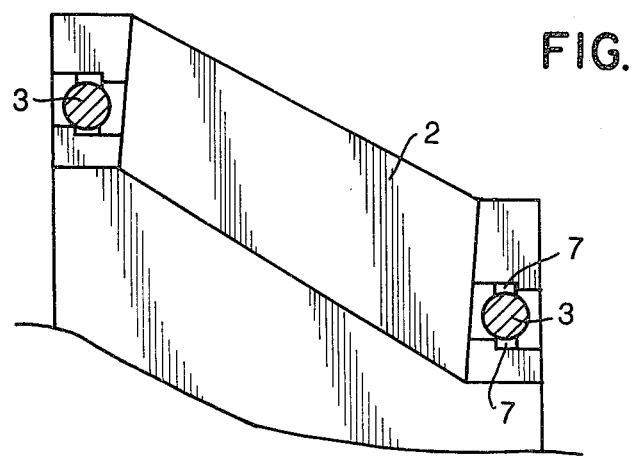
Figure 3:
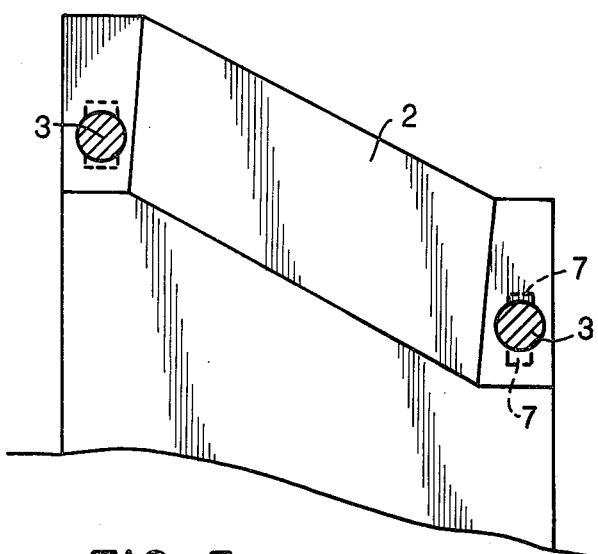
Figure 4:
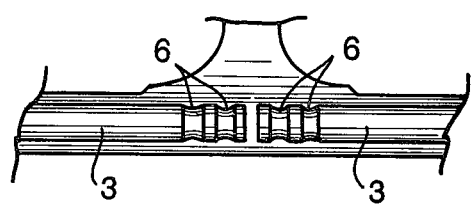
Figure 5:
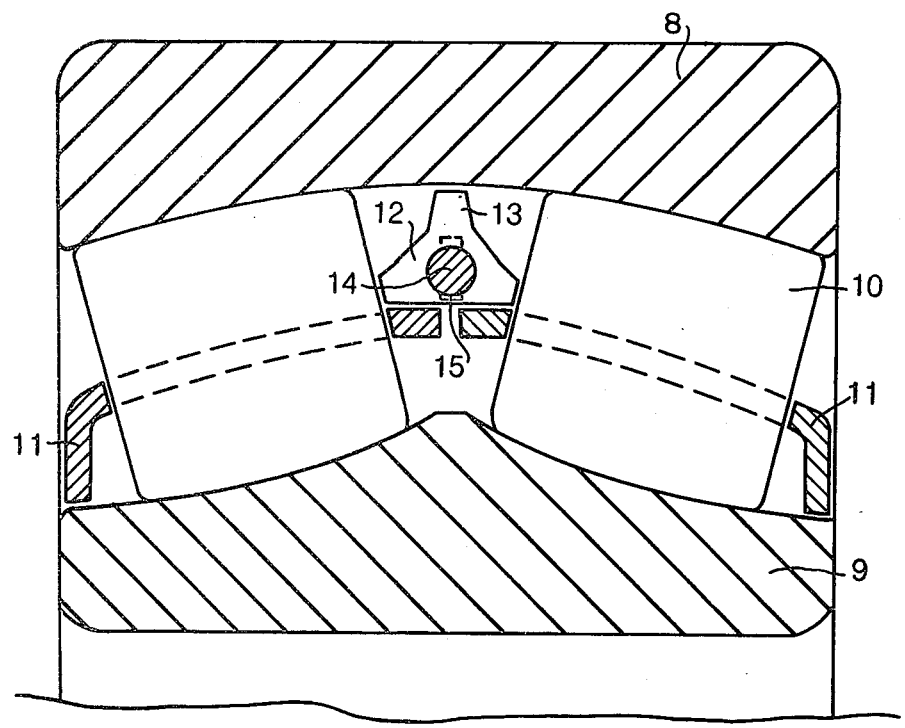
Figure 6:
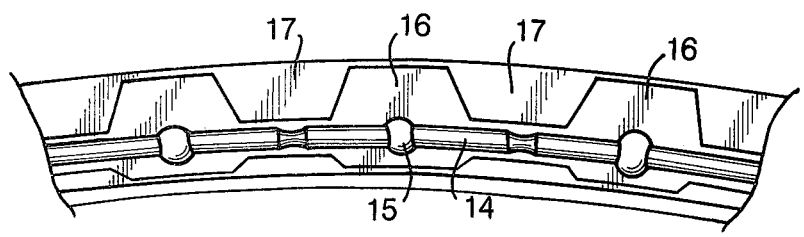

The invention will hereinafter be further described with reference to the accompanying drawings, in which FIG. 1 shows a part of a window type retainer for a two-row spherical rolling bearing, FIG. 2 shows a section through the retainer along line B—B in FIG. 1, FIG. 3 shows a section along line A—A in FIG. 1, FIG. 4 shows a section through the portion of the retainer in which the steel rings are joined, FIG. 5 shows a double-row spherical bearing with conventional retainers which are guided by a guiding ring according to the invention, and FIG. 6 shows a section through the guiding ring according to FIG. 5.

The window type retainer according to FIG. 1 consists of two annular parts 1 and webs 2 provided therebetween. The webs 2 are molded in plastic material without other reinforcement than glass fibre or the like which is common for this purpose. The annular parts 1 are also molded from a plastic material, but as shown in FIGS. 1 and 3, the plastic is molded to cover rings 3, which preferably consist of steel, when it concerns a bearing which otherwise is made from steel. The rings 3 can be joined, but they can also be open or even consist of several parts. It is most suitable to let the rings be open and to join them by means of the embedding plastic material. Thereby all tolerance problems with the steel rings are avoided.

As can be seen from the figure, the plastic embedding is made coarse at the portions 4, where the webs are joined to the annular parts 1. Between the webs at the areas 5 the plastic embedding has been made weak, whereby the thermal expansion properties of the steel rings 3 shall dominate over those of the plastic material.

In order to let the plastic webs be safely anchored to and positioned in relation to the steel rings, these are provided with indentations and projections 6 respectively in the area 4. These indentations can be made by upsetting the steel rings 3, which gives both indentations and projections. The plastic material outside these adherence areas may be so loosely anchored to the steel rings that sliding can occur between steel and plastic material. Unnecessary strains in the retainer are thereby avoided.

FIG. 2 shows a section through the retainer at the portions 5. As shown the steel ring 3 is embedded in a rather limited quantity of plastic material. As shown in the figure the ring 3 is provided with projections 7 intended for anchoring of the plastic material. These projections 7 are also used for maintaining the ring in its position in the tool during molding.

FIG. 3 shows how the steel ring 3 in the area 4 has been covered by much more plastic material.

FIG. 4 shows how the ends of the steel ring 3 have been joined by aid of the plastic material. The layer of plastic material between the ends is so thin that its thermal expansion can be neglected. The ends of the ring have as seen been provided with two indentations 6 whereby an especially secure anchorage of the plastic material at the ring ends is obtained.

FIG. 5 shows a double-row spherical rolling bearing with outer race ring 8, inner race ring 9, rolling bodies 10, conventional retainers 11 and a guiding ring 12. This guiding ring is according to the invention made from plastic material 13, which is molded around a steel ring 14. This steel ring 14 has been provided with projections 15 for safe anchoring of the plastic material in the same manner as the retainer according to the invention.

FIG. 6 finally shows the guiding ring according to FIG. 5 as seen from the side. Said ring consists of the steel ring 14 and has an embedding of plastic material 13 which is thick and stable in the areas 16, where it is anchored by aid of the projections 15. Between these areas 16 are arranged reduced portions 17 of plastic material, whereby the plastic material shall not be able to dominate over the steel as to thermal expansion. In certain cases these portions 17 of plastic material can be completely omitted.

With the present invention is provided i.e. a retainer, which can be centered either on the outer race ring, on the inner race ring, or on the rollers. This depends on the fact that the retainer as to thermal expansion has the same properties as steel. The tolerances can also, due to this, be made more stringent, as it is not necessary to consider the coefficient of thermal expansion of the plastic material. Close tolerances give improved roller guiding and a better bearing function.

The invention is not limited to the embodiments shown but can be modified in different manners within the scope of the claims. It is thus e.g. not necessary that the ring 3 is a thread. It can also be in the form of a steel belt or the like.

What is claimed is:

1. A retainer for a rolling bearing including inner and outer race rings and rolling elements in the annular space between the rings comprising a pair of annular members and a series of circumferentially spaced webs between the annular members defining pockets for the rolling elements, said annular members consisting of a ring-like reinforcing member of a metallic material having substantially the same coefficient of thermal expansion as the race rings and embedded in an outer shell of a plastic material having a different coefficient of thermal expansion, said metallic ring-like reinforcing members being anchored to said plastic outer shell at said web locations and said outer shell being of a greater cross sectional area at said web locations than the areas in between whereby the thermal expansion properties of said metallic reinforcing members dominates.

2. A retainer as claimed in claim 1 wherein the plastic embedding material is loosely connected at predetermined locations to permit sliding between the plastic material and the annular reinforcing members.

3. A retainer as claimed in claim 1 wherein the annular ring-like reinforcing members comprise a plurality of segments arranged in an annular array and joined at their confronting axial ends by the plastic embedding material.

4. A retainer as claimed in claim 1 wherein the plastic embedding materials in the areas between the webs of the retainers is weaker than adjacent the webs so that the thermal properties of the metallic ring-like reinforcing members dominates the thermal properties of the plastic.

5. A retainer as claimed in claim 1 wherein the ring-like reinforcing members are provided with projections or indentations for rigid connection to the plastic embedding material.

6. A retainer as claimed in claim 1 wherein the secure attachment of the plastic embedding material is arranged in the area where the webs of the retainer are connected to the annular parts of the retainer.

7. A retainer as claimed in claim 1 wherein the embedding of the ring-like reinforcing members in the area between the webs is weaker than adjacent the webs.

* * * * *